US009569477B1

(12) United States Patent
McSweeney et al.

(10) Patent No.: US 9,569,477 B1
(45) Date of Patent: Feb. 14, 2017

(54) MANAGING SCANNING OF DATABASES IN DATA STORAGE SYSTEMS

(75) Inventors: Thomas J. McSweeney, Hoquiam, WA (US); John D. Hushon, Medfield, MA (US); Humberto Rodriguez, Williamsburg, MA (US); Stephen J. Todd, Shrewsbury, MA (US); Peter J. McCann, Mason, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 322 days.

(21) Appl. No.: 12/980,853

(22) Filed: Dec. 29, 2010

(51) Int. Cl.
*G06F 17/00* (2006.01)
*G06F 17/30* (2006.01)

(52) U.S. Cl.
CPC .............................. *G06F 17/30336* (2013.01)

(58) Field of Classification Search
CPC ............... G06F 17/30336; G06F 17/30545; G06F 12/0875; G06F 17/30477; G06F 17/3048; G06F 2212/465; G06F 9/5016; G06F 17/30457; G06F 17/3046; G06F 17/30445

See application file for complete search history.

(56) References Cited

U.S. PATENT DOCUMENTS

| 3,623,014 | A | * | 11/1971 | Doelz et al. ............... 714/6.12 |
| 7,693,820 | B2 | * | 4/2010 | Larson ............. G06F 17/30457 707/999.002 |
| 7,734,580 | B2 | * | 6/2010 | Lahiri ................ G06F 11/2035 707/609 |
| 7,921,130 | B2 | * | 4/2011 | Hinshaw et al. ............. 707/769 |
| 8,285,707 | B2 | * | 10/2012 | Day et al. .................... 707/713 |
| 2002/0069193 | A1 | * | 6/2002 | Beavin ............. G06F 17/30454 |
| 2004/0143637 | A1 | * | 7/2004 | Koning et al. ............... 709/212 |
| 2008/0177700 | A1 | * | 7/2008 | Li et al. .......................... 707/3 |
| 2008/0201390 | A1 | * | 8/2008 | Anguelov ................... 707/204 |

* cited by examiner

*Primary Examiner* — Angelica Ruiz
(74) *Attorney, Agent, or Firm* — Krishnendu Gupta; Robert Kevin Perkins; Deepika Bhayana (57) ABSTRACT

A method, system, and program, product for managing scanning of databases in data storage system, the method comprising receiving a query request from an application server to a data storage system, scanning data stored in the data storage system and based on the query request, returning a set of data to the application server, wherein the set of data corresponds to the query request.

20 Claims, 5 Drawing Sheets

MANAGING SCANNING OF DATABASES IN DATA STORAGE SYSTEMS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to managing scanning of databases.

BACKGROUND

A data warehouse is a central repository for all or significant parts of the data that is collected by an enterprise's business systems. Data from various sources is selectively extracted and organized on the data warehouse database for use by analytical applications and user queries. Data storage for the data warehouse database is often implemented in standard storage technologies like storage area network (SAN).

As businesses attempt to deal with the massive explosion in data, the ability to make real-time decisions that involve enormous amounts of information is critical to remain competitive. Today's data warehousing solutions face challenges as they deal with the increasing volumes of data, number of users, and complexity of analysis. As a result, it is imperative that data warehouse solutions seamlessly scale to address these challenges.

Most of today's general-purpose relational database management systems are designed for Online Transaction Processing ("OLTP") applications. OLTP transaction workloads require quick access and updates to a small set of records. This work is typically performed in a localized area on disk, with one or a small number of parallel units. However, On-Line Analytical Processing ("OLAP") technology enables data warehouses to be used effectively for online analysis, providing rapid responses to iterative complex analytical queries. OLAP's multidimensional data model and data aggregation techniques organize and summarize large amounts of data so it can be evaluated quickly using online analysis and graphical tools. The answer to a query into historical data often leads to subsequent queries as the user of the system searches for answers or explores possibilities. Thus, OLAP applications generally spend a significant amount of time scanning a large set of data. Therefore, typical On-Line Analytical Processing (or OLAP) applications have requirements for high throughput, require often sequential access to the underlying storage system (for example, in the order of tens of gigabytes/sec or terabytes/hour) over extremely large datasets (for example, in the order of tens to hundreds of Terabytes). Further, solutions targeted to OLTP applications do not work well for OLAP applications.

Hence, there is a need in the industry for a method and apparatus for managing scanning of databases in data storage systems to increase the efficiency and performance of OLAP applications.

SUMMARY

A method, system, and program, product for managing scanning of databases in data storage system, the method comprising receiving a query request from an application server to a data storage system, scanning data stored in the data storage system and based on the query request, returning a set of data to the application server, wherein the set of data corresponds to the query request.

DETAILED DESCRIPTION

Typically, OLAP applications request data in form of data blocks from a storage system. Conventionally, these data blocks transfer through multiple components in the data storage system such as an array memory, SAN network, and into a memory of server running OLAP applications. Every data transfer adds latency and effectively limits the aggregate bandwidth of data that can be processed by the servers. Once the data block reaches the server's memory, database-specific scan processing may be performed. If the data requested by the OLAP application is not the same as the data block fetched in the server's memory, the data block is discarded. Thus, available network bandwidth is wasted by retrieving and transferring data blocks that may be discarded after comparison in the server's memory. Thus, conventionally, a scanning database may saturate the storage system I/O bandwidth by retrieving large set of data and sending it across I/O connections.

By contrast, in at least some embodiments of the current invention, managing the scanning of a database inside the storage system significantly improves the performance of OLAP applications. In an embodiment of the current invention, managing the scanning of a database in data storage systems makes SAN systems more suitable for OLAP workloads, and reduces I/O bandwidth and reduces storage latency.

In at least some embodiments of the current invention as described herein, managing the scanning of databases in data storage systems can provide one or more of the following advantages: reducing the size of a dataset that may be returned from the storage system during database scan and/or sort processing by managing the scanning and sorting of the dataset within the storage system instead of transferring the dataset for scanning and sorting to a server running OLAP applications, increasing throughput of the storage system by reducing the size of the dataset that is returned to a user for a query sent to the data storage system by the user.

In an embodiment of the current invention, performing scan processing on the data storage system provides an opportunity for the data storage system to work more cooperatively with other processes that may already be running in the data storage system's environment to enhance the capabilities of both the data storage system and an application server sending a query request. Further, managing the scanning of databases in data storage systems provides the ability to optimize locking and caching strategies. Additionally, managing the scanning of databases in data storage systems provide opportunity to partition datasets stored in the data storage system at an appropriate level that better utilizes local caches of the data storage system, and provides better load balancing of resources within the data storage system and reduces throughput latency.

In an embodiment of the current invention, because data blocks are scanned and processed in the data storage system, only data blocks that are relevant to a query sent by a user are returned to a server running OLAP applications. By processing data blocks within the data storage system greatly increase the efficiency of data searches and reduces the load on components that may be involved in transferring data blocks to the server running OLAP applications. Further, the data storage system may gain knowledge regarding how data blocks are processed in the data storage system, in turn, enabling the data storage system to optimize storage system's operations such as caching and storage tiering (allocation of different kind of disk storage for different dataset). Additionally, a new set of transport protocols may be introduced in the data storage system that may allow semantic interpretation of data blocks, as opposed to a SCSI protocol which treats data blocks as opaque objects. Further, scanning and processing data blocks in the data storage system enables additional conditional scan optimization operators to minimize transfer of data blocks, introduces other optimizations (such as FAST) for local scan optimization with better understanding of data processing through structural hints, and ability to quickly complete database operations such as Create, Update, and Delete (CUD) statements, through storage system's guaranteed completion semantics via an application aware, shared-memory flush.

Figure 1:
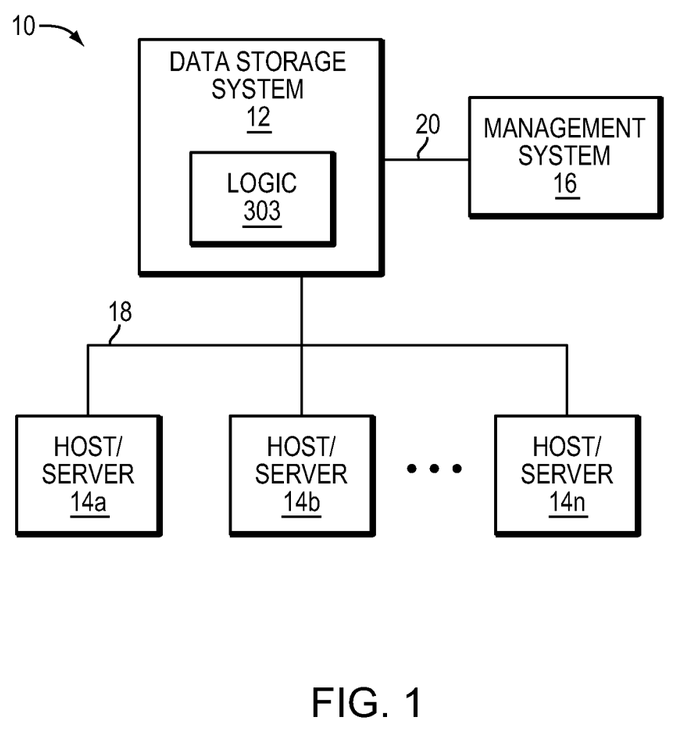
FIG. 1 is a diagram illustrating an example environment in which example embodiments of the present invention maybe employed.

FIG. 1 is a diagram illustrating an example environment in which example embodiments of the present invention maybe employed. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors.

Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the current invention as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the current invention herein. As will be appreciated by those skilled in the art, the data storage system 12 may also include other components than as described for purposes of illustrating the invention herein.

The embodiment of FIG. 1 benefits from scanning datasets of a database within a storage system in accordance with the current invention in order to improve the performance of a scan processing within the embodiment. In particular, scan processing logic 303 included in data storage system 12 may benefit from knowledge of data block patterns and of the context, importance or other classification of the data elements being stored, accessed and manipulated.

Figure 2:
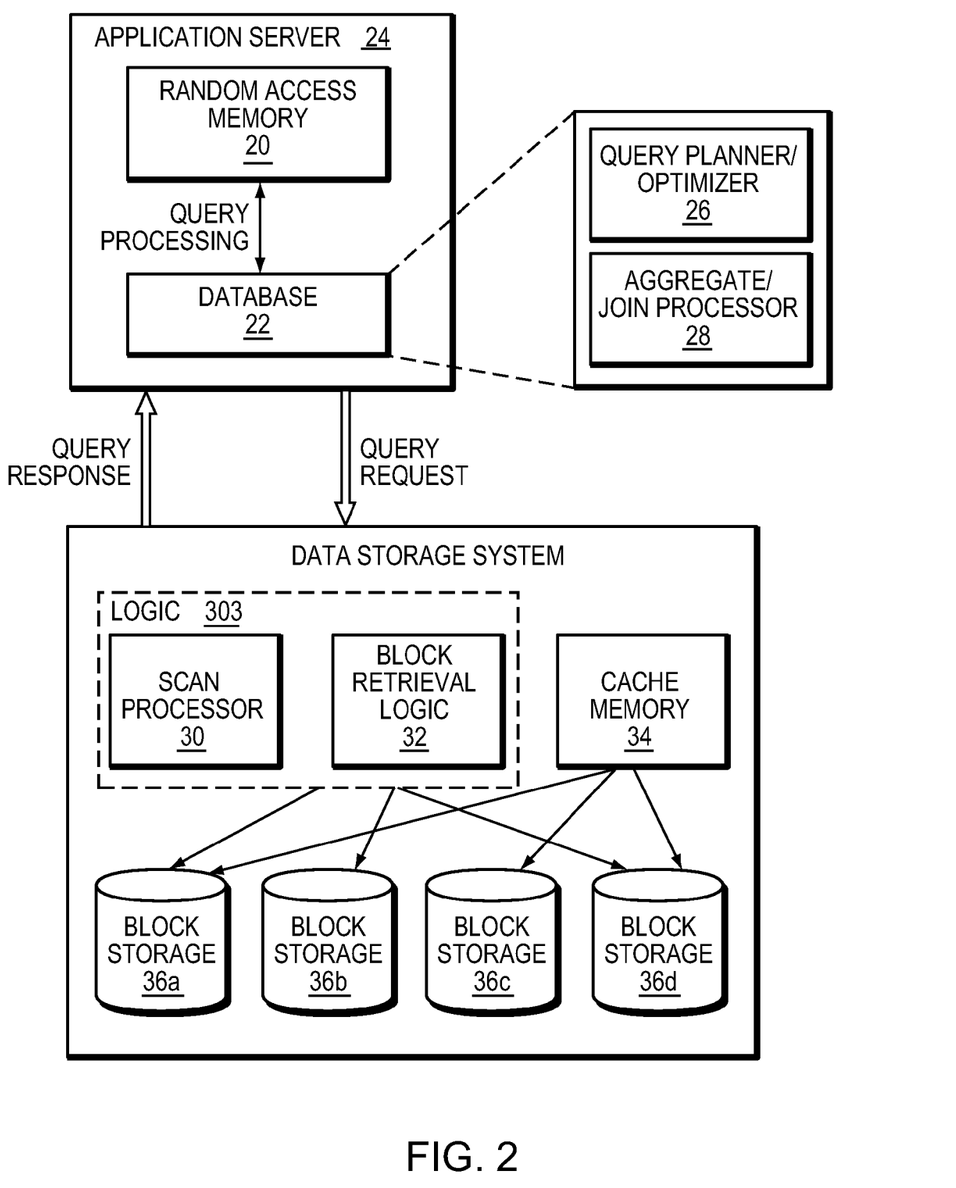
FIG. 2 is a block diagram illustrating an example embodiment system and apparatus of the present invention for managing scanning of databases in data storage systems.

FIG. 2 is a block diagram illustrating an example embodiment system and apparatus of the present invention for managing scanning of databases in data storage systems. In an embodiment of the current invention, application server 24 runs applications that queries large set of datasets, such as OLAP applications and applications that search the internet. Database logic 22 that exists in application server 24 includes query planner and/or optimizer 26 and aggregate and/or join processor 28. Query optimizer 26 optimizes a query issued by a user of the application server 24. A query typically includes one or more criteria (also referred to as "predicate"). Data is retrieved from storage system that satisfies every criteria included in the query. For example, a query may include criteria such as retrieve files having a name attribute=*.doc, and a size attribute of >10 MB, and a time-last-modified attribute of >10/5/2004, all ordered in decreasing order of file size. Aggregate/join processor 28 splits various predicates of a query in an appropriate chunks and retrieve datasets incrementally. Datasets are stored on physical disks such as block storage 36a-d in a data storage system. The data storage system further includes cache memory 34 that is used to temporarily save dataset retrieved as part of a predicate of a query. Program logic 303 includes scan processor 30 and block retrieval logic 32. Block retrieval logic 32 retrieves data set that matches criteria of a query into cache memory 34 for evaluation. Scan processor 30 then evaluates dataset fetched by block retrieval logic 32. Scan processor 30 evaluates dataset to determine whether data blocks match criteria of a query. Data blocks that match the query are sent back to application server 24 that in turns stores data blocks into random access memory 20 for further optimization if desired by the application server. Random access memory 20 is used a local cache for retrieving and evaluating large datasets. By performing scanning of data within the data storage system, CPU and random access memory 20 of application server 24 is no longer a bottleneck in database processing as only the data blocks that satisfy a predicate of a query are returned to application server 24 instead of large dataset that needs to be evaluated in random access memory of application server 24.

A query may be based on any query language such as SQL, NoSQL, map reduce and so on. In a query that is based on map reduce, criteria are organized in a pair of key and value. For example, a key may be a block number of a data block and value may be content of data block. Every operation in a query may be indicated by a weight that determines optimizations that may be performed on the query. Based on various factors such as weight and cost of an operation, query optimizer 26 may split the query into one or more parts that may be processed in parallel. Further, the data storage system may learn from what type of content is stored in data blocks and estimate time it may take to complete a query operation. Knowledge gained from content of data blocks and query operation may be used in optimizing query operations and reducing cost of query operations. Because, the data storage system performs scanning of dataset, evaluates predicates of a query and only return blocks that satisfy the query, the data storage system may learn from retrieval patterns and may layout data blocks on physical storage intelligently in order to improve performance. For example certain data blocks may reside on disks with slow access rate, certain data blocks may reside on disk with high access rate, and certain data blocks may reside in local cache and so on.

Scan processor 30 in the data storage system further creates positive, negative and NULL indexes that help to further optimize a query. A positive index indicates that a data block is present at a location indicated by the index. A negative index indicates that a data block is not present at a location indicated by the index. A NULL index indicates that data block may be ignored during scan processing. Hence, during scanning operation, the location indicated by the NULL index may be skipped by block retrieval logic 32. Program logic 303 of the current invention performed in the data storage system enables the data storage system to better manage the data stored in disks and thus minimizes bandwidth and cost of performing a query by application server 24. Further, scan processing 30 in the data storage system results in optimized datasets being returned to application server 24.

In an embodiment of the current invention, Constant Database, known as CDB, is used for implementing hints for dataset in the data storage system. CDB is a data structure suitable for looking up static data which is associated with arbitrary byte sequences (usually strings). Hints are used to notify application server 24 and provide application server 24 information regarding scanning of databases, such as number of matches, state of an operation of a query, cost of an operation of a query and so on. The information helps application server 24 makes better decisions regarding query planning.

In an embodiment of the current invention, scan processing in the data storage system enables one or more following optimizations in the data storage system: efficient pre-fetch of datasets by retrieving intelligently only relevant data blocks into cache memory 34 of the data storage system, efficient cache hierarchies and policies by learning from retrieval patterns of data blocks, improved or introducing new block mapping structures that help in understanding where data blocks reside on the disk storage, creating a target environment for evaluation languages by augmenting block mapping structures to accept external query evaluators and efficient transfer of data blocks from the data storage system to the application server.

Figure 3:
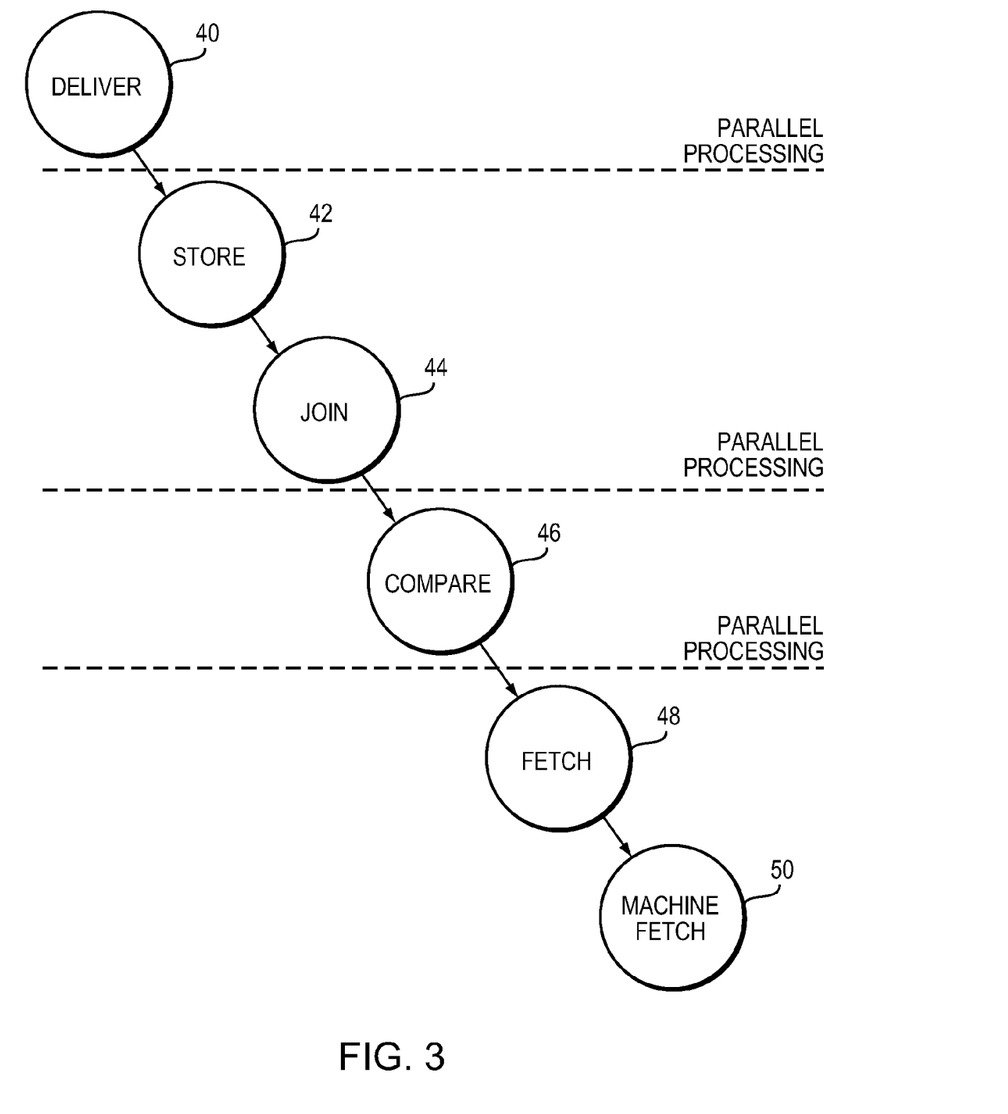
FIG. 3 is a block diagram illustrating an example embodiment method of the present invention performed at a computer platform for processing query sent to data storage systems.

FIG. 3 is a block diagram illustrating an example embodiment method of the present invention performed at a computer platform for processing query sent to data storage systems. For example, FIG. 3 illustrates a simplified graph of a query operation. The query includes one or more operations, such as deliver 40, store 42, join 44, compare 46, fetch 48 and machine fetch 50. Every operation in the query provides an opportunity to split the query for further optimization and processing one or more operations in parallel. For example, fetch 48 retrieves every data block for further evaluation, compare 46 evaluates data blocks retrieved by fetch 48 by comparing content of data blocks to one of the predicates of the query. Further, for example, both compare 46 and fetch 48 operation can be optimized further based on knowledge of location of data blocks and data patterns. Therefore, the data storage system only returns data blocks that are relevant to a query operation and helps further optimize the query.

Figure 4:
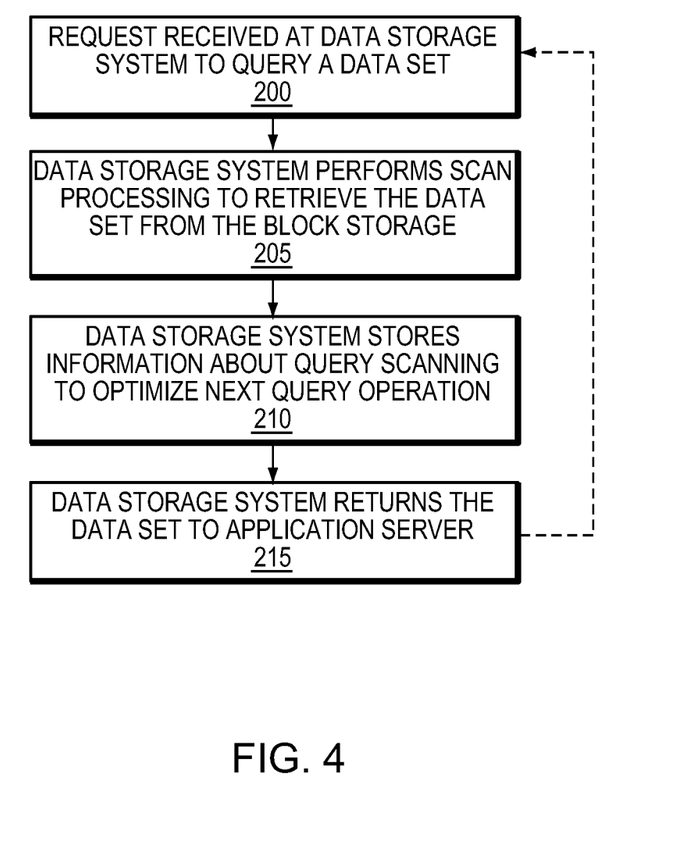
FIG. 4 is a flow diagram illustrating an example embodiment method of the present invention.

FIG. 4 is a flow diagram illustrating an example embodiment method of the present invention. A data storage system receives request from OLAP applications to query a data set (200). The data storage system performs scan processing to retrieve the data set from the disk storage (205). The data storage system stores information regarding scan processing in order to adapt and optimize scan processing for next query operation (210). The data storage system returns the data set that it retrieves from the disk storage to OLAP application server (215).

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 1, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 5:
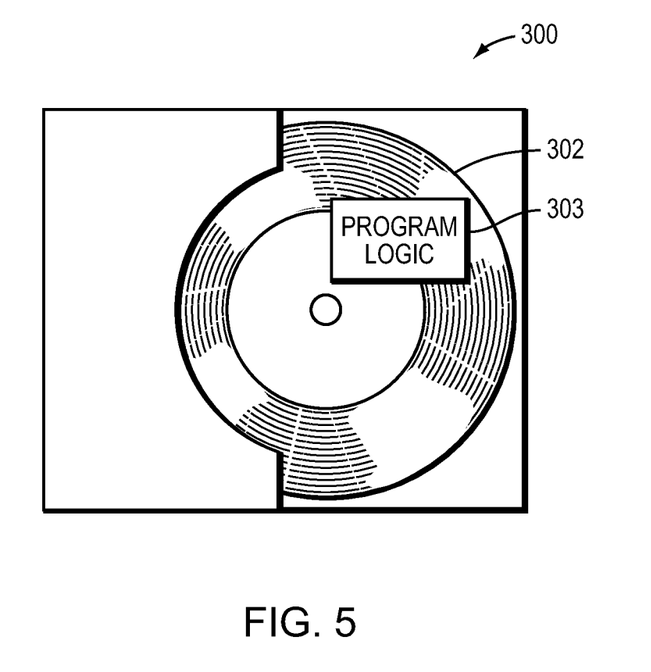
FIG. 5 is diagram illustrating an example embodiment method of the present invention embodied as program code or a program product.

FIG. 5 shows Program Logic 303 embodied on a computer-readable medium 302 as shown, and wherein the Logic is encoded in computer-executable code configured for carrying out the reservation service process of this invention and thereby forming a Computer Program Product 300.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

The invention claimed is:

1. A method for use in managing scanning of databases in data storage systems, the method comprising:

receiving a query request from an application server to a data storage system, wherein the application server includes a database logic, wherein the application server queries a set of databases based on the database logic, wherein the database logic includes a query planner and a query optimizer;

managing scanning of data within the data storage system instead of transferring the data to the application server for scanning by scanning data blocks stored in the data storage system within the data storage system, wherein the data blocks are organized on a set of logical volumes, wherein the set of databases is organized on the set of logical volumes, wherein the data storage system processes the data blocks associated with the query request inside the data storage system by using a scan processor and a data block retrieval logic included in the data storage system, wherein the data storage system uses information associated with the data blocks for processing the data blocks and creating a result set, wherein the scanning of the data blocks is performed inside the data storage system by the scan processor, wherein the data blocks are retrieved from the data storage system by using the data block retrieval logic in a cache of the data storage system, wherein the scan processor evaluates the data blocks retrieved by the data block retrieval logic in the cache for determining whether a subset of the data blocks corresponds to the query request, wherein the result set includes a portion of the data blocks processed by the data storage system;

storing information associated with the scanning of data blocks for optimizing subsequent query requests received from the application server, wherein the information associated with the scanning of the data blocks for optimizing subsequent query requests include data block processing patterns, wherein optimizing the subsequent query requests include scan optimizations, wherein the data storage system minimizes amount of data transferred to the application server in the result set by using the scan optimizations; and based on the query request, the data storage system provides the result set to the application server, wherein the result set corresponds to the query request, wherein the result set includes the subset of the data blocks.

2. The method of claim 1, further comprising storing information regarding scanning of data in the data storage system for optimizing processing of next query request from the application server.

3. The method of claim 1, wherein a query request is targeted to a storage of a data storage system, wherein the storage is selected from the group consisting of a storage based on a data block, a storage based on a file and a storage based on an object.

4. The method of claim 1, wherein scan processing logic is provided in the data storage system.

5. The method of claim 1, wherein data retrieval logic is provided in the data storage system.

6. The method of claim 1, wherein a database processing logic is provided in the data storage system, wherein the database processing logic allows partitioning of scanning of data.

7. The method of claim 1, wherein the query request is selected from the group consisting of a query request based on a SQL, and a query request based on a map-reduce.

8. The method of claim 1, wherein the application server executes an on line transaction processing (OLTP) applications.

9. The method of claim 1, wherein scanning of data further comprising scanning one or more data sets in parallel, wherein data is partitioned into one or more data sets.

10. The method of claim 2, wherein the information stored in the data storage system includes usage of data.

11. A system comprising:
a data storage system including at least one storage device;
an application server in communication with the data storage system; and
a computer-executable logic in communication with the data storage system and the application server for carrying out the steps of:
receiving a query request from the application server to the data storage system, wherein the application server includes a database logic, wherein the application server queries a set of databases based on the database logic, wherein the database logic includes a query planner and a query optimizer;
managing scanning of data within the data storage system instead of transferring the data to the application server for scanning by scanning data blocks stored in the data storage system within the data storage system, wherein the data blocks are organized on a set of logical volumes, wherein the set of databases is organized on the set of logical volumes, wherein the data storage system processes the data blocks associated with the query request inside the data storage system by using a scan processor and a data block retrieval logic included in the data storage system, wherein the data storage system uses information associated with the data blocks for processing the data blocks and creating a result set, wherein the scanning of the data blocks is performed inside the data storage system by the scan processor, wherein the data blocks are retrieved from the data storage system by using the data block retrieval logic in a cache of the data storage system, wherein the scan processor evaluates the data blocks retrieved by the data block retrieval logic in the cache for determining whether a subset of the data blocks corresponds to the query request, wherein the result set includes a portion of the data blocks processed by the data storage system;

storing information associated with the scanning of data blocks for optimizing subsequent query requests received from the application server, wherein the information associated with the scanning of the data blocks for optimizing subsequent query requests include data block processing patterns, wherein optimizing the subsequent query requests include scan optimizations, wherein the data storage system minimizes amount of data transferred to the application server in the result set by using the scan optimizations; and based on the query request, the data storage system provides the result set to the application server, wherein the result set corresponds to the query request, wherein the result set includes the subset of the data blocks.

12. The system of claim 11, wherein the data storage system stores information regarding scanning of data in the data storage system for optimizing processing of next query request from the application server.

13. The system of claim 11, wherein scan processing logic is provided in the data storage system.

14. The system of claim 11, wherein data retrieval logic is provided in the data storage system.

15. The system of claim 11, wherein a database processing logic is provided in the data storage system, wherein the database processing logic allows partitioning of scanning of data.

16. The system of claim 11, wherein the query request is selected from the group consisting of a query request based on a SQL, and a query request based on a map-reduce.

17. The system of claim 11, wherein the application server executes an on line transaction processing (OLTP) applications.

18. The system of claim 11, wherein scanning of data further comprising scanning one or more data sets in parallel, wherein data is partitioned into one or more data sets.

19. The system of claim 12, wherein the information stored in the data storage system includes usage of data.

20. A program product for use in managing scanning of databases in data storage systems, the program product comprising:
a non-transitory computer-readable storage medium encoded with computer-executable program code enabling:
receiving a query request from an application server to a data storage system, wherein the application server includes a database logic, wherein the application server queries a set of databases based on the database logic, wherein the database logic includes a query planner and a query optimizer;

managing scanning of data within the data storage system instead of transferring the data to the application server for scanning by scanning data blocks stored in the data storage system within the data storage system, wherein the data blocks are organized on a set of logical volumes, wherein the set of databases is organized on the set of logical volumes, wherein the data storage system processes the data blocks associated with the query request inside the data storage system by using a scan processor and a data block retrieval logic included in the data storage system, wherein the data storage system uses information associated with the data blocks for processing the data blocks and creating a result set, wherein the scanning of the data blocks is performed inside the data storage system by the scan processor, wherein the data blocks are retrieved from the data storage system by using the data block retrieval logic in a cache of the data storage system, wherein the scan processor evaluates the data blocks retrieved by the data block retrieval logic in the cache for determining whether a subset of the data blocks corresponds to the query request, wherein the result set includes a portion of the data blocks processed by the data storage system;

storing information associated with the scanning of data blocks for optimizing subsequent query requests received from the application server, wherein the information associated with the scanning of the data blocks for optimizing subsequent query requests include data block processing patterns, wherein optimizing the subsequent query requests include scan optimizations, wherein the data storage system minimizes amount of data transferred to the application server in the result set by using the scan optimizations; and based on the query request, the data storage system provides the result set to the application server, wherein the result set corresponds to the query request, wherein the result set includes the subset of the data blocks.

* * * * *